United States Patent
Nudejima et al.

(10) Patent No.: US 11,080,574 B2
(45) Date of Patent: Aug. 3, 2021

(54) IMAGE PROCESSING APPARATUS

(71) Applicant: FUJIFILM BUSINESS INNOVATION CORP., Tokyo (JP)

(72) Inventors: Masaki Nudejima, Kanagawa (JP); Tomoyuki Ono, Kanagawa (JP); Takayuki Hashimoto, Kanagawa (JP); Daiki Takazawa, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 16/824,942

(22) Filed: Mar. 20, 2020

(65) Prior Publication Data
US 2021/0056368 A1   Feb. 25, 2021

(30) Foreign Application Priority Data
Aug. 20, 2019 (JP) .............................. JP2019-150418

(51) Int. Cl.
*G06K 15/00* (2006.01)

(52) U.S. Cl.
CPC ................................ *G06K 15/401* (2013.01)

(58) Field of Classification Search
CPC .................................................... G06K 15/401
USPC ............................................................ 358/1.16
See application file for complete search history.

(56) References Cited

U.S. PATENT DOCUMENTS

2014/0043343 A1\* 2/2014 Iwai ......................... G06T 1/60
   345/502

FOREIGN PATENT DOCUMENTS

JP           2014-35619 A      2/2014

\* cited by examiner

*Primary Examiner* — Jacky X Zheng
(74) *Attorney, Agent, or Firm* — Oliff PLC (57) ABSTRACT

An image processing apparatus includes a processor configured to process an image; a reading direct memory access controller (DMAC) configured to read data from the memory; a writing DMAC configured to write data to the memory, each DMAC configured to control direct memory access to a memory; an upper first-in first-out (FIFO) unit connected to the reading and writing DMACs and includes FIFOs of the number equal to the number of channels of each of the reading and writing DMACs and a lower FIFO unit connected between the upper FIFO unit and the processor and includes FIFOs that correspond to the FIFOs of the upper FIFO unit at a ratio of 1 upper FIFO unit to F lower FIFO units (F being an integer equal to 2 or larger).

7 Claims, 10 Drawing Sheets

| | | 100 | 101 | 102 | 103 | 104 | 105 |
|---|---|---|---|---|---|---|---|
| FOR READING | FIFO44 | L88+L92+L96 | L89+L93+L97 | L90+L94+L98 | L91+L95+L99 | L92+L96+L100 | L93+L97+L101 |
| | FIFO43 | L89+L93+L97 | L90+L94+L98 | L91+L95+L99 | L92+L96+L100 | L93+L97+L101 | L94+L98+L102 |
| | FIFO42 | L90+L94+L98 | L91+L95+L99 | L92+L96+L100 | L93+L97+L101 | L94+L98+L102 | L95+L99+L103 |
| | FIFO41 | L91+L95+L99 | L92+L96+L100 | L93+L97+L101 | L94+L98+L102 | L95+L99+L103 | L96+L100+L104 |
| FOR WRITING | FIFO45 | L92+L96+L100 | L93+L97+L101 | L94+L98+L102 | L95+L99+L103 | L96+L100+L104 | L97+L101+L105 |
| | port N12 | L88 | L89 | L90 | L91 | L92 | L93 |
| | port N11 | L89 | L90 | L91 | L92 | L93 | L94 |
| | port N10 | L90 | L91 | L92 | L93 | L94 | L95 |
| | port N9 | L91 | L92 | L93 | L94 | L95 | L96 |
| | port N8 | L92 | L93 | L94 | L95 | L96 | L97 |
| | port N7 | L93 | L94 | L95 | L96 | L97 | L98 |
| INPUT FROM LINE BUFFER | port N6 | L94 | L95 | L96 | L97 | L98 | L99 |
| | port N5 | L95 | L96 | L97 | L98 | L99 | L100 |
| | port N4 | L96 | L97 | L98 | L99 | L100 | L101 |
| | port N3 | L97 | L98 | L99 | L100 | L101 | L102 |
| | port N2 | L98 | L99 | L100 | L101 | L102 | L103 |
| | port N1 | L99 | L100 | L101 | L102 | L103 | L104 |
| INPUT | port N0 | L100 | L101 | L102 | L103 | L104 | L105 |

IMAGE PROCESSING APPARATUS

CROSS-REFERENCE TO RELATED APPLICATIONS

This application is based on and claims priority under 35 USC 119 from Japanese Patent Application No. 2019-150418 filed Aug. 20, 2019.

BACKGROUND

(i) Technical Field

The present disclosure relates to an image processing apparatus.

(ii) Related Art

Typical image processing apparatuses process an image in steps of window of multiple pixels. In such image processing, one line of the image is read and saved on a memory. Data corresponding to one line responsive to the size of the window is read from the memory and then processed. Data transfer between an arithmetic core performing image processing and the memory storing the data on each line is performed in a direct memory access (DMA) fashion.

Japanese Unexamined Patent Application Publication No. 2014-35619 discloses an image processing apparatus including multiple image processing modules, a memory, and a DMA controller (DMAC) that controls memory access of the image processing modules.

Image quality may be controlled by modifying the size of a window (window size) in the image processing performed by window units. Modifying the number of lines of data for the window to modify the window size involves a change in the number of channels of the DMAC that controls the memory access.

SUMMARY

Aspects of non-limiting embodiments of the present disclosure relate to saving time used to change the number of channels of the DMAC in changing the window size.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus. The image processing apparatus includes a processor configured to processing an image, a reading direct memory access controller (DMAC) and a writing direct memory access controller (DMAC), each DMAC configured to control direct memory access to a memory. The reading DMAC is configured to read data from the memory and the writing DMAC is configured to write data to the memory. The image processing apparatus further includes an upper first-in first-out (FIFO) unit that is connected to the reading DMAC and the writing DMAC and includes FIFOs of the number equal to the number of channels of each of the reading DMAC and the writing DMAC and a lower FIFO unit that is connected between the upper FIFO unit and the processor and includes FIFOs that correspond to the FIFOs of the upper FIFO unit at a ratio of 1 FIFO in the upper FIFO unit to F FIFOs in the lower FIFO unit (F being an integer equal to 2 or larger). The number of lines of data input to the processor is modifiable in steps of the number of channels of the reading DMAC by not using part of the F FIFOs corresponding to each FIFO of the upper FIFO unit.

BRIEF DESCRIPTION OF THE DRAWINGS

Exemplary embodiment of the present disclosure will be described in detail based on the following figures, wherein.

DETAILED DESCRIPTION

Exemplary embodiment of the disclosure is described with reference to the drawings. An image processing apparatus of the exemplary embodiment of the disclosure acquires image data read from an image and performs image processing with a processor as a processing unit. An image reading device (such as an image input terminal (IIT)) acquires the image data by reading the image in steps of a scan line. The image data per line is referred to as line data. The line data is read in lines and saved on a line buffer.

The processor receives one line read last and retrieves from a line buffer the line data for multiple (n−1) lines read until immediately before the one line, performs image processing on the line data for a total of n lines, and output processed data for one line. Specifically, the processor performs the image processing on the line data for the n lines in window units with each window including m pixels×n lines and generates processed data for one pixel representing the window. The processor performs the image processing along the line while shifting the window by one pixel at a time and acquires and outputs the processed data for one line including processed data for a consecutive series of pixels.

Figure 10:
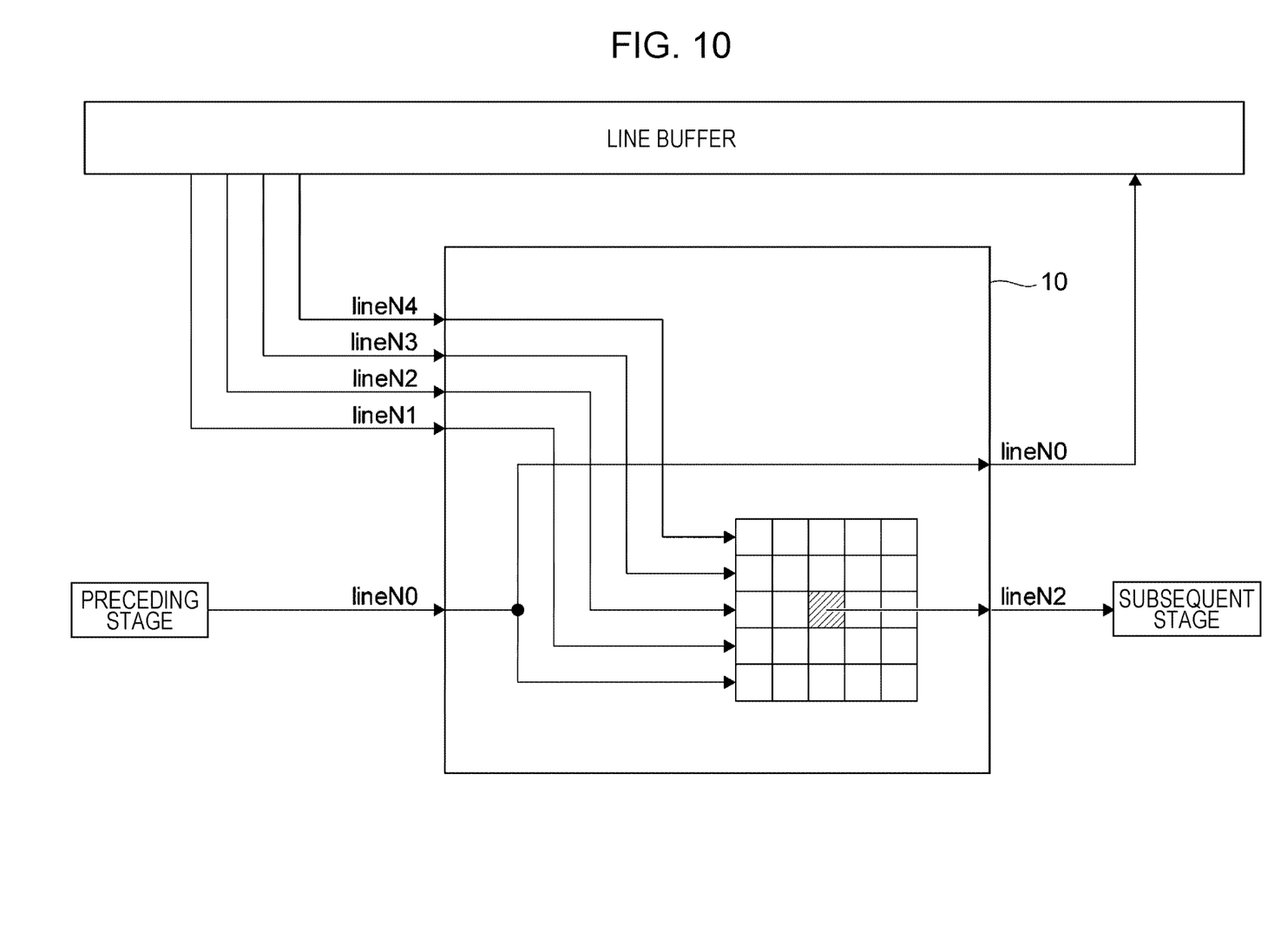
FIG. 10 illustrates a concept of image processing of an exemplary embodiment.

FIG. 10 illustrates a concept of the image processing of the exemplary embodiment. Referring to FIG. 10, the window size is 5 pixels×5 lines. Line data line N0 for one line read by an image reading device (denoted by "preceding stage" in FIG. 10) is input to the processor 10 while also being transferred to and saved on a line buffer. Line data for four lines, line N1, line N2, line N3, and line N4, read until immediately before the line N0 and saved, is read and the line data for the four lines is input together with the line data line N0 to the processor 10.

The processor 10 performs the image processing on the acquired line data for the 5 lines (line N0 through N4) while shifting by one pixel at a time the window having a window size of 5 pixels×5 lines and generates the processed data. The processed data is generated as position data of the position of any pixel in the window. Referring to FIG. 10, the processed data is generated as the position data of a center pixel in the window of 5 pixels×5 lines (the third pixel from the left end or the right end of line N2). The line data for the 1 line generated with the window successively shifted by a pixel at a time is output as the processed data for the line N2 and transferred to a subsequent stage (for example, an image output terminal (IOT)).

As described above, the window is a square having a window size of 5 pixels×5 lines. The number of lines of the window size is defined more in detail by the number of pieces of line data input to the processor 10. The number of pixels may be set in accordance with the throughput of the processor 10 or the like. The window set in the processor 10 may not necessarily be limited to the square window that is defined by the number of pixels equal to the number of lines. When the window size is quoted in the following discussion, the number of lines is specified while the number of pixels is not specified.

Figure 1:
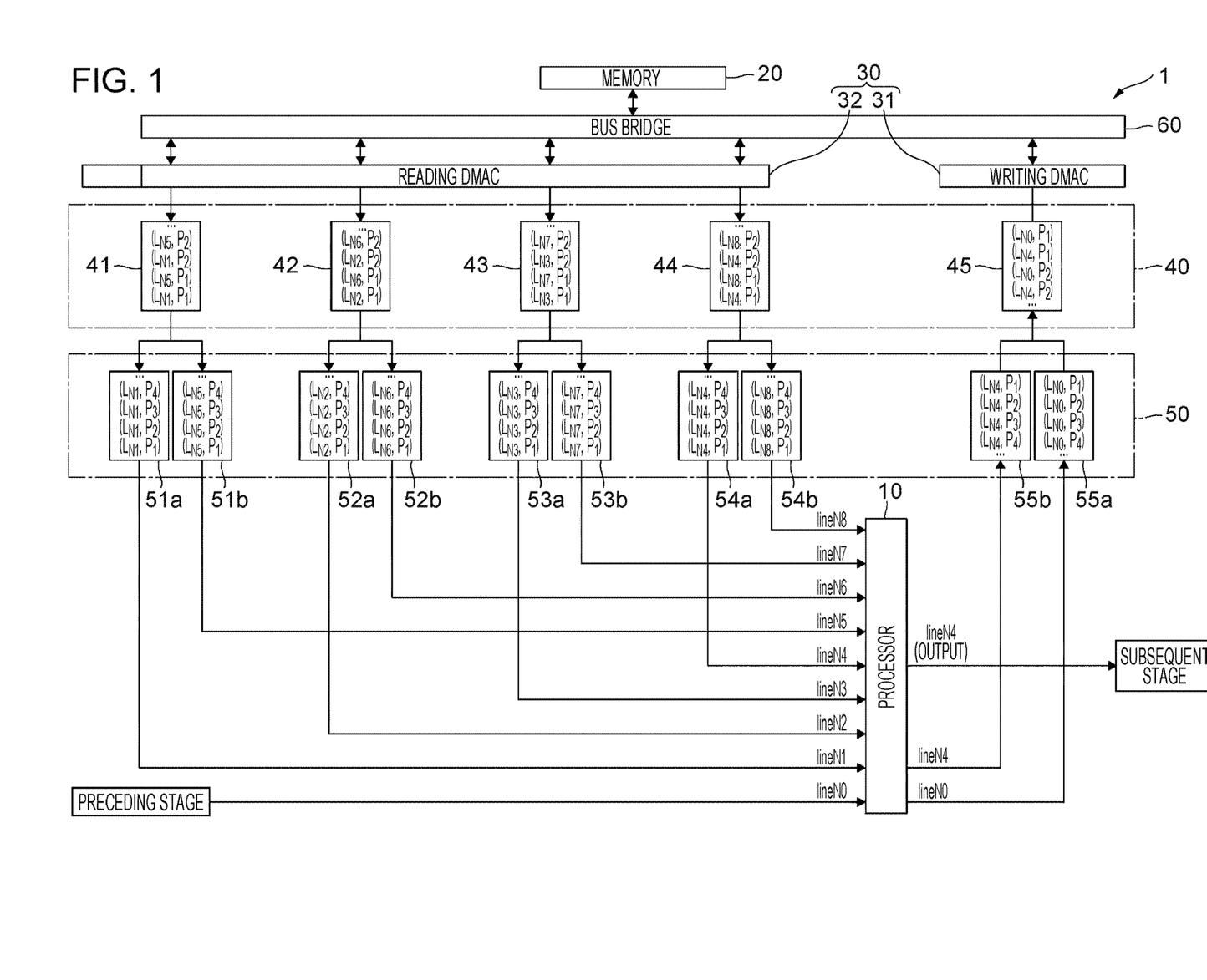
FIG. 1 illustrates a configuration of an image processing apparatus.

FIG. 1 illustrates a configuration of an image processing apparatus 1. The image processing apparatus 1 includes a processor 10, memory 20 forming the line buffer, direct memory access controller (DMAC) 30, upper first-in first-out (FIFO) unit 40, lower FIFO unit 50, and bus bridge 60. The DMAC 30 includes a writing DMAC 31 and reading DMAC 32. Each of the upper FIFO unit 40 and lower FIFO unit 50 includes multiple FIFOs.

The processor 10 is a digital filter that performs a filtering process on digital data of an image. The processor 10 performs the filtering process in window units with each window including multiple pixels. As described above, the processor 10 reads the line data of the number of pieces responsive to the window size (lines N0 through N8 in FIG. 1) and outputs the processed line data of one line (line N4 in FIG. 1). The processor 10 transfers, to the line buffer, part (line N0 and line N4 in FIG. 1) of the line data out of the read line data in the original state. The line data serving as a transfer target is described below.

The memory 20 saves the line data of pixels that are read line by line. The memory 20 may be a dynamic random-access memory (DRAM), a static random-access memory (SRAM), or the like. The memory 20 may be a shared memory that is a working memory used in the arithmetic operation of a central processing unit (CPU).

The DMAC 30 controls memory access in the image processing apparatus 1. The DMAC 30 includes the writing DMAC 31 that is used to write data on the memory 20 and the reading DMAC 32 that is used to read data from the memory 20. The writing DMAC 31 writes data on one channel. The reading DMAC 32 reads data on multiple channels. In the configuration in FIG. 1, the reading DMAC 32 has 4 channels.

The upper FIFO unit 40 and lower FIFO unit 50 are buffers that are used to write or read data on the memory 20 through the DMAC 30. The upper FIFO unit 40 is connected to the DMAC 30. The lower FIFO unit 50 is connected between the upper FIFO unit 40 and the processor 10.

The upper FIFO unit 40 includes first-in first-outs (FI-FOs), the number of which corresponds to the number of channels of each of the writing DMAC 31 and reading DMAC 32. The number of FIFOs in the upper FIFO unit 40 connected to the writing DMAC 31 corresponds to the number of channels of the writing DMAC 31, namely, the number of FIFOs is 1. The FIFO connected to the writing DMAC 31 is a FIFO 45. The number of FIFOs in the upper FIFO unit 40 connected to the reading DMAC 32 corresponds to the number of channels of the reading DMAC 32, namely, the number of FIFOs is C (C is an integer equal to or above). In the configuration in FIG. 1, C equals 4 and 4 FIFOs, namely, FIFOs 41 through 44, are employed.

The lower FIFO unit 50 includes F FIFOs corresponding to each of the FIFOs 41 through 45 in the upper FIFO unit 40 (F is an integer equal to or above 2). In the configuration in FIG. 1, F equals 2. The total number of FIFOs in the lower FIFO unit 50 corresponding to the FIFOs 41 through 44 in the upper FIFO unit 40 connected to the reading DMAC 32 is C×F.

Let n represent the total number of pieces of the line data input to the processor 10. Specifically, the total number of pieces of line data read from the memory 20 out of the line data to be input to the processor 10 is (n−1). Since the lower FIFO unit 50 is connected to the processor 10, the number of FIFOs in the lower FIFO unit 50 is (n−1) that corresponds to the number of pieces of the line data read from the memory 20 and input to the processor 10. Specifically, the number of FIFOs in the lower FIFO unit 50 on the side of the reading DMAC 32 is expressed by the following equation:

$$C \times F = n-1.$$

Since C=4 and n=9 (9 lines from lines N0 through N8) in the configuration in FIG. 1, F=2. The lower FIFO unit 50 includes two FIFOs for each of the FIFOs in the upper FIFO unit 40 on the side of the reading DMAC 32, namely, FIFOs 51$a$ and 51$b$, FIFOs 52$a$ and 52$b$, FIFOs 53$a$ and 53$b$, and FIFOs 54$a$ and 54$b$ respectively for the FIFOs 41 through 44 in the upper FIFO unit 40. The same is true of the side of the writing DMAC 31. The lower FIFO unit 50 includes two FIFOs 55$a$ and 55$b$ for the single FIFO 45 in the upper FIFO unit 40.

The bus bridge 60 is a bridge circuit arranged between the memory 20 and the DMAC 30. The DMAC 30 is connected to the memory 20 via the bus bridge 60 and writes or reads data on the memory 20.

Data transfer between the processor 10 and the line buffer is described with reference to the configuration in FIG. 1. In the configuration in FIG. 1, the processor 10 includes nine input ports (N0 through N8). The input port N0 receives the line data read last from an image. The input ports N1 through N8 receives the line data of 8 lines retrieved from the line buffer. Typically, the input port N0 from among the n input ports receives the line data read last from the image and the input ports N1 through N(n−1) receive the line data for the (n−1) lines retrieved from the line buffer.

The layout order of the input ports N1 through N8 agrees with the age of the line data. Specifically, the line data read immediately before the line data input to the input port N0 is input to the input port N1 and the line data read one line before is input to the input port N2. Similarly, the line data read further before is input to the following ports. Finally, the oldest line data read 8 lines before is input to the input port N8.

The input ports N1 through N8 are respectively connected to FIFOs 51$a$ and 51$b$ through FIFOs 54$a$ and 54$b$ in the lower FIFO unit 50 on the side of the reading DMAC 32. Specifically, the input port N1 is connected to the FIFO 51$a$ in the lower FIFO unit 50. The input port N2 is connected to the FIFO 52$a$ in the lower FIFO unit 50. The input port N3 is connected to the FIFO 53$a$ in the lower FIFO unit 50. The input port N4 is connected to the FIFO 54$a$ in the lower FIFO unit 50. The input port N5 is connected to the FIFO 51$b$ in the lower FIFO unit 50. The input port N6 is connected to the FIFO 52$b$ in the lower FIFO unit 50. The input port N7 is connected to the FIFO 53$b$ in the lower FIFO unit 50. The input port N8 is connected to the FIFO 54b in the lower FIFO unit 50.

The processor 10 includes the output port (N4 (output)) used to output, as process results, output data and two output ports (N0 and N4) used to output the line data in the original input state. The output ports correspond to the center line (N4) from among all line data N0 through N8 input via the input ports. In the following discussion, the output port that is used to output the input line data just as it is input is referred to as a "transfer port" to differentiate it from the output port that is used to output the processed data. The transfer port N0 outputs the line data that has been input to the input port N0 and the transfer port N4 outputs the line data that has been input to the input port N4.

The transfer port is typically set as described below. The output port corresponding to the input port N0 is the transfer port N0. From among the input ports corresponding to the line data from the line buffer, input ports that are at locations away from N1 (latest) and correspond to an integer multiple of the number of channels C of the reading DMAC 32 are N4 and N8 in FIG. 1. The output port corresponding to the input port (N4 in FIG. 1) that is other than the input port for the last (oldest) line data (N8 in FIG. 1) is the transfer port N4. C represents the number of channels of the reading DMAC 32 and P represents an integer equal to or greater than 1 and equal to or smaller than F (F is the number of FIFOs in the lower FIFO unit 50 corresponding to a FIFO in the upper FIFO unit 40). The output ports NL corresponding to the input ports NL (L=C×(P−1)) are set as the transfer ports.

The transfer port N0 is connected to the FIFO 55a in the lower FIFO unit 50. The transfer port N4 is connected to the FIFO 55b in the lower FIFO unit 50. The line data output from the transfer ports N0 and N4 are supplied to the FIFOs 55a and 55b in the lower FIFO unit 50 on the side of the writing DMAC 31. In the example in FIG. 1, the output of the transfer port N0 is supplied to the FIFO 55a and the output of the transfer port N4 is supplied to the FIFO 55b.

Referring to FIG. 1, letters $(L_{N0}, P_1)$ and the like written in the FIFOs 55a and 55b represent information supplied to the FIFOs 55a and 55b and unique to the line data (corresponding port and synchronization information). For example, $(L_{N0}, P_1)$ of the FIFO 55a and $(L_{N4}, P_1)$ of the FIFO 55b represent the line data output from the transfer port N0 and the transfer port N4 at the same timing $P_1$. $(L_{N4}, P_1), (L_{N4}, P_2), (L_{N4}, P_3), (L_{N4}, P_4), \ldots$ represent the line data output from the transfer port N4 at the timings $P_1, P_2, P_3, P_4, \ldots$, respectively.

The line data saved at the FIFO 55a and the line data saved at the FIFO 55b in the lower FIFO unit 50 are alternately transferred to the FIFO 45 in the upper FIFO unit 40. In the configuration in FIG. 1, the line data is saved in the order of $(L_{N0}, P_1), (L_{N4}, P_1), (L_{N0}, P_2), (L_{N4}, P_2), \ldots$. The writing DMAC 31 reads the line data in order from the FIFO 45 and then saves the line data on the memory 20 via the bus bridge 60.

Typically, in the FIFO 45 and the FIFOs 55a and 55b in the upper FIFO unit 40 on the side of the writing DMAC 31, the line data transferred from the processor 10 to the lower FIFO unit 50 is successively transferred piece by piece in order from the FIFOs 55a and 55b to the FIFO 45 in the upper FIFO unit 40. The writing DMAC 31 then writes the line data in order on the memory 20.

The reading DMAC 32 reads from the memory 20 via the bus bridge 60 the line data corresponding to the number of channels of the reading DMAC 32 and causes the FIFOs 41 through 44 in the upper FIFO unit 40 to save the read line data. The FIFO 41 saves alternately the line data to be transferred to the FIFOs 51a in the lower FIFO unit 50 and the line data to be transferred to 51b in the lower FIFO unit 50. In the example in FIG. 1, the line data $(L_{N1}, P_1), (L_{N5}, P_1), (L_{N1}, P_2), (L_{N5}, P_2), \ldots$, is saved on the FIFO 41. At the moment the line data is read from the memory 20, one cycle advances from the time point when the line data is written on the memory 20, and new line data $L_N$ is received. The line data $(L_{N0}, P_1)$ and $(L_{N4}, P_1)$ written from the FIFO 45 to the memory 20 is read as the line data $(L_{N1}, P_1)$ and $(L_{N5}, P_1)$.

The FIFO 42 alternately saves the line data to be supplied the FIFO 52a in the lower FIFO unit 50 and the line data to be supplied to the FIFO 52b in the lower FIFO unit 50. In the example in FIG. 1, the line data $(L_{N2}, P_1), (L_{N6}, P_1), (L_{N2}, P_2), (L_{N6}, P_2), \ldots$, is saved on the FIFO 41. The line data to be supplied to the FIFO 42 is the line data that is supplied to the FIFO 41 at the immediately preceding cycle. Now that the new line data $L_N$ is read with one cycle advanced, the line data read from the memory 20 is supplied to the FIFO 42 with one line shifted.

The FIFO 43 alternately saves the line data to be supplied the FIFO 53a in the lower FIFO unit 50 and the line data to be supplied to the FIFO 53b in the lower FIFO unit 50. In the example in FIG. 1, the line data $(L_{N3}, P_1), (L_{N7}, P_1), (L_{N3}, P_2), (L_{N7}, P_2), \ldots$, is saved on the FIFO 43. The line data to be supplied to the FIFO 43 is the line data that is supplied to the FIFO 42 at the immediately preceding cycle. Now that the new line data $L_N$ is read with one cycle advanced, the line data read from the memory 20 is supplied to the FIFO 43 with one line shifted.

The FIFO 44 alternately saves the line data to be supplied the FIFO 54a in the lower FIFO unit 50 and the line data to be supplied to the FIFO 54b in the lower FIFO unit 50. In the example in FIG. 1, the line data $(L_{N4}, P_1), (L_{N8}, P_1), (L_{N4}, P_2), (L_{N8}, P_2), \ldots$, is saved on the FIFO 44. The line data to be supplied to the FIFO 44 is the line data that is supplied to the FIFO 43 at the immediately preceding cycle. Now that the new line data $L_N$ is read with one cycle advanced, the line data read from the memory 20 is supplied to the FIFO 44 with one line shifted.

The FIFO 41 alternately supplies the line data to the FIFO 51a in the lower FIFO unit 50 and the line data to the FIFO 51b in the lower FIFO unit 50. In the example in FIG. 1, the line data $(L_{N1}, P_1), (L_{N1}, P_2), (L_{N1}, P_3), (L_{N1}, P_4), \ldots$, is transferred to the FIFO 51a and the line data $(L_{N5}, P_1), (L_{N5}, P_2), (L_{N5}, P_3), (L_{N5}, P_4), \ldots$, is transferred to the FIFO 51b. Similarly, the line data is transferred from the FIFO 42 to the FIFOs 52a and 52b, the line data is transferred from the FIFO 43 to the FIFOs 53a and 53b, and the line data is transferred from the FIFO 44 to the FIFOs 54a and 54b. In the example in FIG. 1, the line data $(L_{N2}, P_1), (L_{N2}, P_2), (L_{N2}, P_3), (L_{N2}, P_4), \ldots$, is transferred to the FIFO 52a and the line data $(L_{N6}, P_1), (L_{N6}, P_2), (L_{N6}, P_3), (L_{N6}, P_4), \ldots$, is transferred to the FIFO 52b. Similarly, the line data $(L_{N3}, P_1), (L_{N3}, P_2), (L_{N3}, P_3), (L_{N3}, P_4), \ldots$, is transferred to the FIFO 53a and the line data $(L_{N7}, P_1), (L_{N7}, P_2), (L_{N7}, P_3), (L_{N7}, P_4), \ldots$, is transferred to the FIFO 53b. The line data $(L_{N4}, P_1), (L_{N4}, P_2), (L_{N4}, P_3), (L_{N4}, P_4), \ldots$, is transferred to the FIFO 54a and the line data $(L_{N6}, P_1), (L_{N8}, P_2), (L_{N8}, P_3), (L_{N8}, P_4), \ldots$, is transferred to the FIFO 54b.

Typically, in the FIFOs 41 through 44 in the upper FIFO unit 40 and in the FIFOs 51a and 51b through the FIFOs 54a and 54b in the lower FIFO unit 50 on the side of the reading DMAC 32, the line data is read from the memory 20 by the reading DMAC 32 and is then saved on the FIFOs 41 through 44. In accordance with the order of the lines input to the memory 20, the line data on the FIFOs 41 through 44 is successively saved piece by piece on the FIFOs 51a and 51b through 54a and 54b in the lower FIFO unit 50 corresponding to the FIFOs 41 through 44 in the upper FIFO unit 40.

The line data of the same synchronization information ($P_1, P_2, P_3, P_4, \ldots$) is supplied to the processor 10 from each of the FIFOs 51a and 51b through 54a and 54b in the lower FIFO unit 50 in each cycle. The input port N0 of the processor 10 receives the line data each time when it is read.

Figure 2:
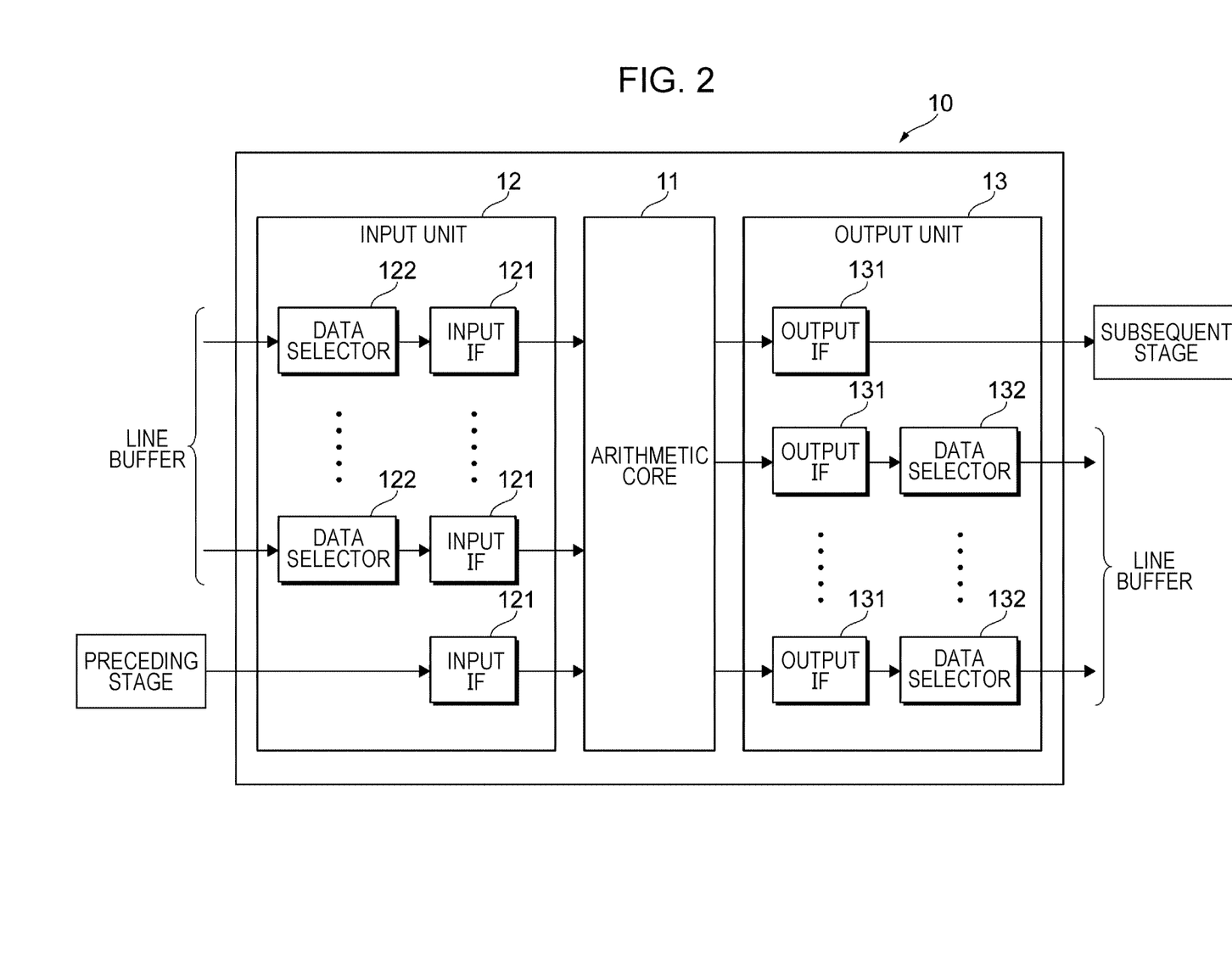
FIG. 2 illustrates a configuration of a processor.

FIG. 2 illustrates a configuration of the processor 10. The processor 10 includes an arithmetic core 11, input unit 12, and output unit 13. The input unit 12 includes multiple input interfaces (IFs) 121 forming input ports, and data selectors 122 controlling on and off of the input ports. In the configuration in FIG. 1, the number of the IFs 121 corresponds to the number of input ports NO, N1 through N8, namely, is nine. The data selectors 122 are respectively arranged for the input IFs 121 forming the input ports except the input port NO. In the configuration in FIG. 1, the number of the data selectors 122 corresponds the number of the input ports N1 through N8, namely, eight. The input IF 121 forming the input port N0 receives data that is read last by an image reading unit (denoted by the "preceding stage" in FIG. 2).

The output unit 13 includes multiple output IFs 131 forming output ports (including transfer ports) and data selectors 132 controlling on and off of the output ports. In the configuration in FIG. 1, the number of output IFs 131 corresponds to the number of output port N4 and transfer ports N0 and N4, namely, is three. The data selectors 132 are respectively arranged for the transfer ports N0 and N4 and the number of the data selector 132 is two.

Figure 3:
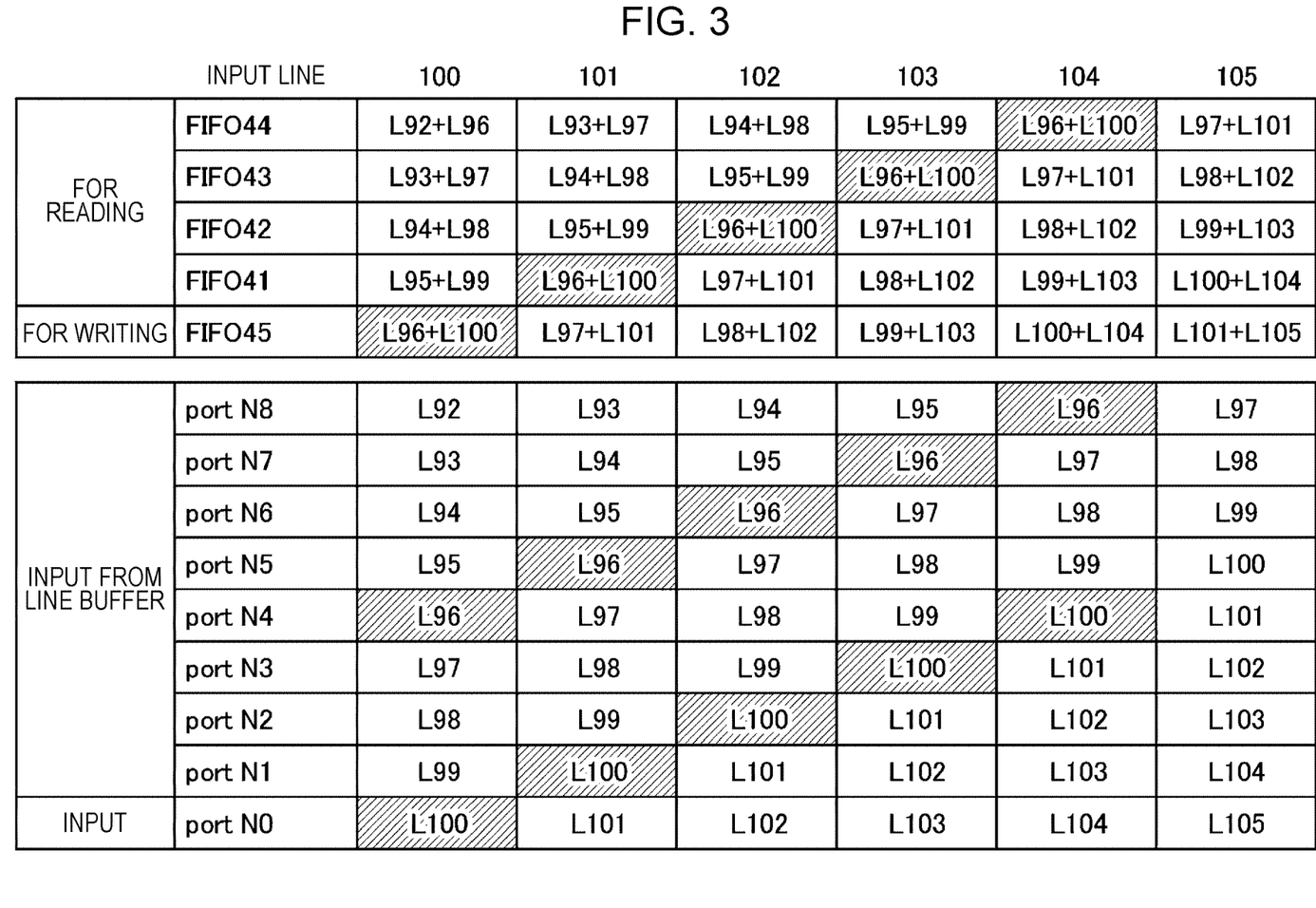
FIG. 3 illustrates a relationship between each first-in first-out (FIFO) in an upper FIFO unit and input ports of the processor.

FIG. 3 is a table illustrating the relationship between the FIFOs 41 through 45 in the upper FIFO unit 40 and the input ports of the processor 10. FIG. 3 illustrates the line data input to the input ports N0 and N1 through N8 of the processor 10 and the line data saved at the FIFOs 41 through 45 in the upper FIFO unit 40 at a timing (cycle) when the line data for 100th through 105th lines is input to the input line (input port NO) through image reading.

Referring to FIG. 3, when the line data at the 100th line is input to the input port N, the next line data is saved at the FIFOs 41 through 44 on the side of the reading DMAC 32. As illustrated in FIG. 3, the line data at the 99th line is denoted by "L99".

FIFO 41: ($L_{N1}$, $P_1$), ($L_{N5}$, $P_1$)→L99, L95
FIFO 42: ($L_{N2}$, $P_1$), ($L_{N6}$, $P_1$)→L98, L94
FIFO 43: ($L_{N3}$, $P_1$), ($L_{N7}$, $P_1$)→L97, L93
FIFO 44: ($L_{N4}$, $P_1$), ($L_{N8}$, $P_1$)→L96, L92

The line data is distributed into the FIFOs 51a and 51b through 54a and 54b in the lower FIFO unit 50 and then transferred to the input ports N1 through N8 as described below. Specifically, the line data is input to the input ports in the order of age, namely, the older data is input to the input port N8 and the younger data is input to the input port N1. Referring to FIG. 3, the input port N1 is denoted as "port N1."

Input port N8: L92
Input port N7: L93
Input port N6: L94
Input port N5: L95
Input port N4: L96
Input port N3: L97
Input port N2: L98
Input port N1: L99

In this cycle, the line data "L100" on the 100th line is input to the input port NO. In the next cycle, the line data "L101" on the 101st line is input to the input port NO. The line data read by the reading DMAC 32 and saved at the FIFOs 41 through 44 and the line data distributed into the input ports N1 through 8 are shifted from the state described above to the new state by line.

The line data output from the transfer ports N0 and N4 is now considered. Since the line data input to the input ports N0 and N4 is output in the original input form thereof from the transfer ports N0 and N4, the output of the transfer port N0 is L100 and the output of the transfer port N4 is L96 at the timing when the line data (L100) on the 100th line is input to the input port NO. The FIFO 45 on the side of the writing DMAC 31 holds $L_N$=L100 and $L_{N4}$=L96. As illustrated in FIG. 3, the locations of L100 and L96 are hatched. Referring to FIG. 3, the new line data is input from the input port N0 every cycle and accordingly, the locations of the input ports to which L100 and L96 are input are consecutively shifted by line by line. Similarly, the FIFOs 41 through 44 saving L100 and L96 read from the memory 20 are consecutively shifted FIFO by FIFO.

Control of the window size of the image processing apparatus 1 constructed as illustrated in FIG. 1 is described below. In accordance with the exemplary embodiment, the line buffer in the image processing apparatus 1 includes multiple FIFOs saving the line data written or read by the DMAC 30. Each of the FIFOs in the upper FIFO unit 40 (the FIFOs 41 through 45 in FIG. 1) respectively correspond to multiple FIFOs in the lower FIFO unit 50 (the FIFOs 51a and 51b through 55a and 55b in FIG. 1). Without modifying the number of channels of the DMAC 30, the number of input lines to the processor 10 may be increased and the window size in the processor 10 may be increased.

In the example in FIG. 1, the reading DMAC 32 having 4 channels and the FIFOs 41 through 44 in the upper FIFO unit 40 are employed. The resulting window size is 5 lines with the input line to the input port N0 added. Since the FIFOs 51a and 51b through 54a and 54b in the lower FIFO unit 50 are then added, the window size is 9 lines with the input line to the input port N0 added. The window size may be modified (reduced) by inactivating some of the FIFOs 51a and 51b through 55a and 55b in the lower FIFO unit 50 corresponding to the FIFOs 41 through 45 in the upper FIFO unit 40.

Figure 4:
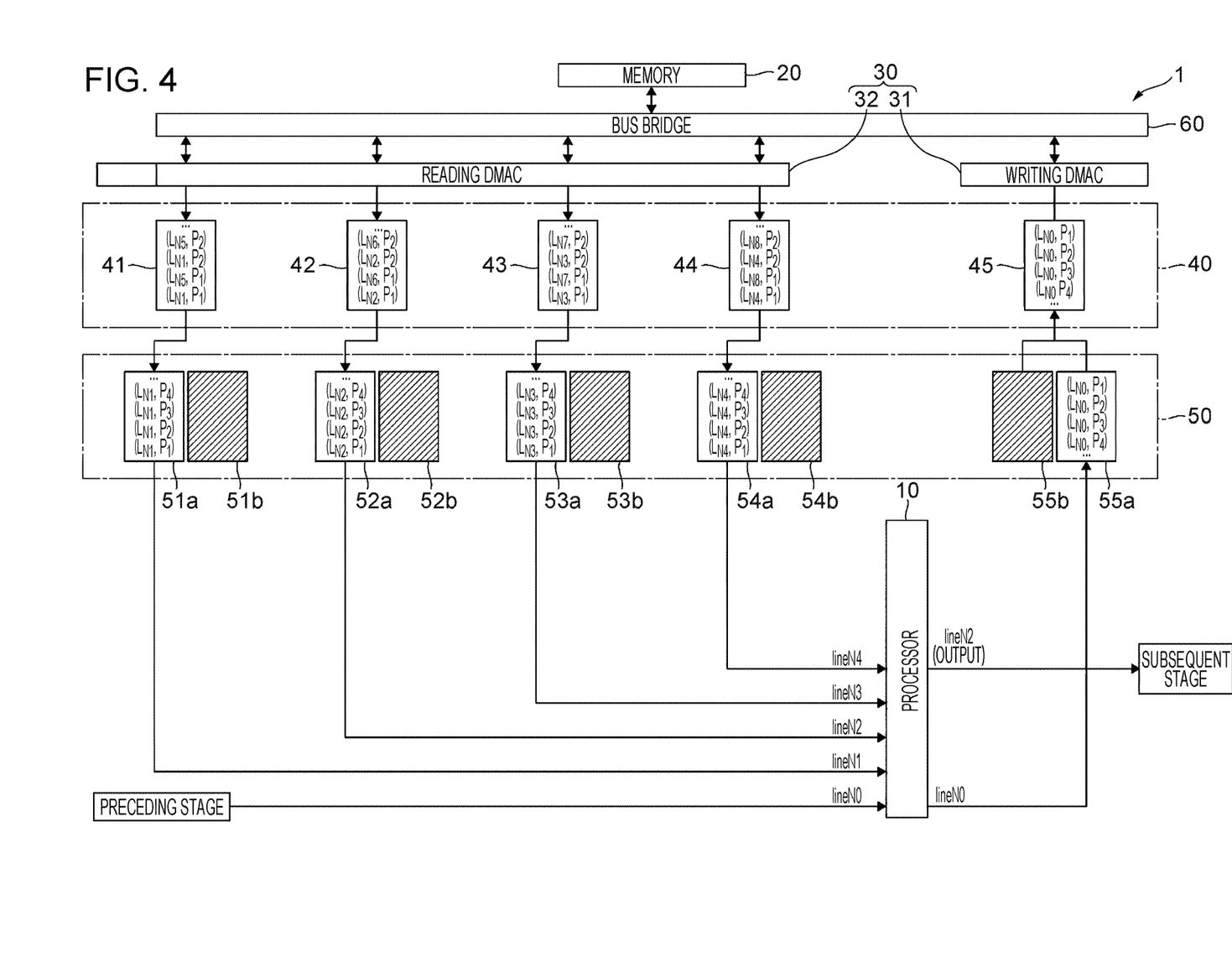
FIG. 4 illustrates a control example of a window size.

FIG. 4 illustrates a control example of the window size. Referring to FIG. 4, the FIFOs 51b, 52b, 53b, 54b, and 55b out of the FIFOs 51a and 51b through 55a and 55b in the lower FIFO unit 50 are inactivated and only the FIFOs 51a, 52a, 53a, 54a, and 55a are used. In this way, the window size is modified (reduced) to 5 lines without modifying the configuration of the DMAC 30 and the upper FIFO unit 40.

In the input ports of the processor 10, the input port N0 having the input line connected thereto and the input lines N1 through N4 having the FIFOs 51a, 52a, 53a, and 54a respectively connected thereto are used while the input ports N5 through N8 are unused. In such a case, the data selectors 122 (see FIG. 2) may disconnect the input ports N5 through N8. However, since the line data from the FIFOs 51b, 52b, 53b, and 54b is not input, the data selectors 122 may not necessarily disconnect the input ports N5 through N8.

Since the active input ports in the processor 10 is N0 through N4, the output port is changed to N2 serving as the center line. Concerning the transfer ports in the processor 10, the transfer port N0 through which the input to the input port N0 is output is used while the transfer port N4 through which the input to the input port N4 is output is not used. In such a case, the data selector 132 (see FIG. 2) disconnects the transfer port N4 such that the input to the input port N4 is not transferred to the FIFO 55b.

Figure 5:
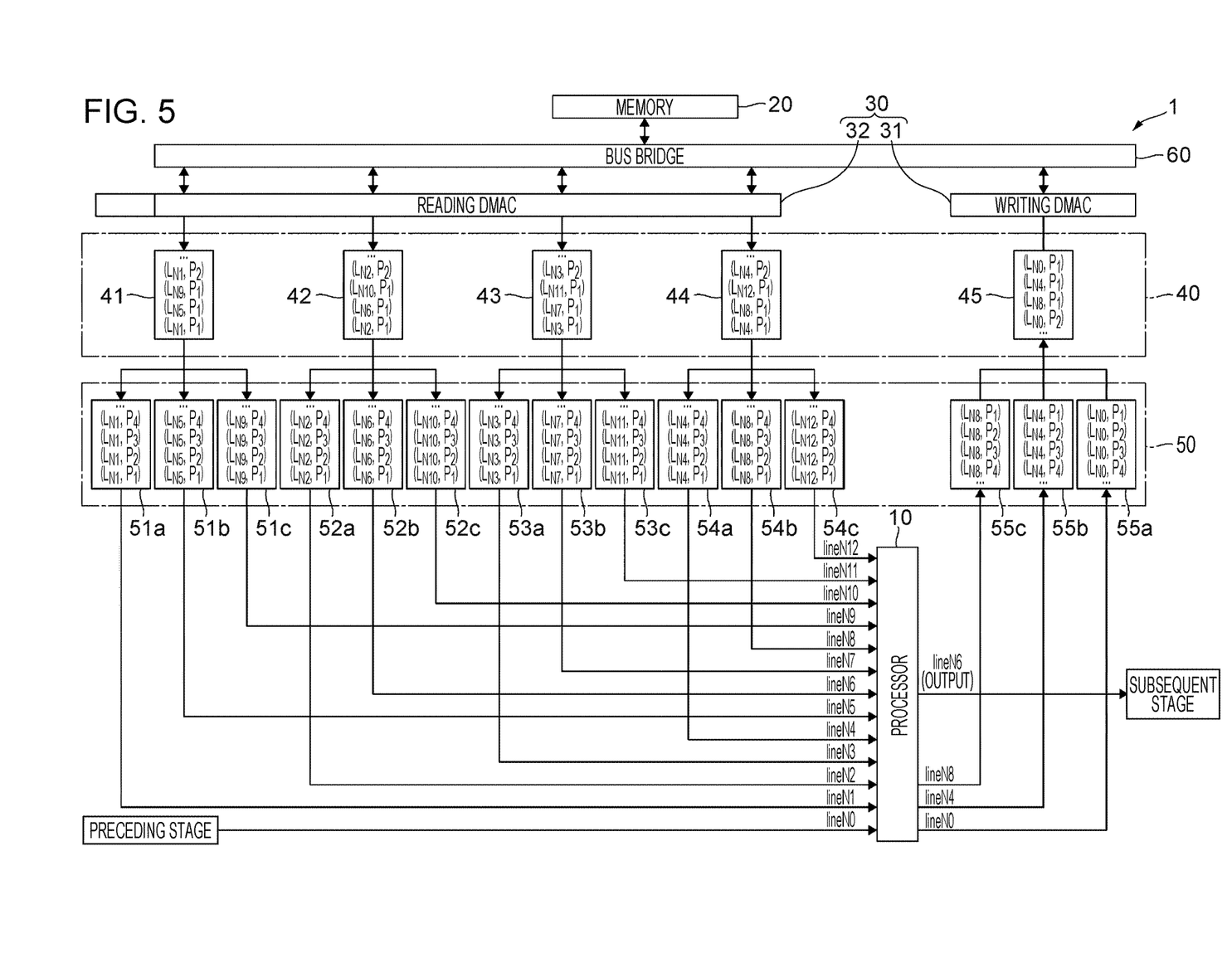
FIG. 5 illustrates another configuration of the image processing apparatus.

FIG. 5 illustrates another configuration of the image processing apparatus 1. The image processing apparatus 1 in FIG. 5 is different from the image processing apparatus 1 in FIG. 1 in terms of the number of FIFOs in the lower FIFO unit 50. The lower FIFO unit 50 has F FIFOs corresponding to each of the FIFOs 41 through 45 in the upper FIFO unit 40. In the configuration in FIG. 5, F=3. Specifically, the lower FIFO unit 50 includes three FIFOs for each of the FIFOs 41 through 44 in the upper FIFO unit 40, namely, FIFOs 51a, 51b, and 51c through FIFOs 54a, 54b, and 54c respectively for the FIFOs 41 through 44 in the upper FIFO unit 40 on the side of the reading DMAC 32. The same is true of the side of the writing DMAC 31. The lower FIFO unit 50 has tree FIFOs 55a, 55b, and 55c for the FIFO 45 in the upper FIFO unit 40.

Let C represent the number of channels of the reading DMAC 32 and n the total number of pieces of the line data input to the processor 10, and C×F=n−1 then, n=C×F+1=4×3+1=13 The total number of pieces of the line data input to the processor 10 is 13. In the configuration in FIG. 5, lines N0 through N12 are input to the processor 10. The processor 10 outputs processed line data N6. Out of the read line data, the processor 10 transfers to the line buffer the line N0, N4, and N8 in the original input state.

The rest of the configuration of the image processing apparatus 1 in FIG. 5 remains unchanged from that of the image processing apparatus 1 in FIG. 1. Specifically, the number of channels of the reading DMAC 32 and the number of FIFOs in the upper FIFO unit 40 in the image processing apparatus 1 are identical to those in the configuration in FIG. 1. But the image processing apparatus 1 includes an increased number of FIFOs in the lower FIFO unit 50. The number of input lines thus increases and the window size per process unit also increase.

Referring to FIG. 5, data transfer between the processor 10 and the line buffer is described. In the configuration in FIG. 5, the processor 10 includes 13 input ports (N0 through N12). The input port N0 receives the line data read last from an image. The input ports N1 through N12 receive 12 lines of the line data acquired from the line buffer. The layout of the input ports N1 through N12 agrees with the age of the line data. Specifically, the line data read immediately before the line data input to the input port N0 is input to the input port N1 and the line data read another line before is input to the input port N2.

Similarly, the line data read further before is input to the following ports. Finally, the oldest line data read 12 lines before is input to the input port N12.

The input ports N1 through N12 are respectively connected to FIFOs 51a, 51b, and 51c through FIFOs 54a, 54b, 54c in the lower FIFO unit 50 on the side of the reading DMAC 32. Specifically, the input port N1 is connected to the FIFO 51a in the lower FIFO unit 50. The input port N2 is connected to the FIFO 52a in the lower FIFO unit 50. The input port N3 is connected to the FIFO 53a in the lower FIFO unit 50. The input port N4 is connected to the FIFO 54a in the lower FIFO unit 50. The input port N5 is connected to the FIFO 51b in the lower FIFO unit 50. The input port N6 is connected to the FIFO 52b in the lower FIFO unit 50. The input port N7 is connected to the FIFO 53b in the lower FIFO unit 50. The input port N8 is connected to the FIFO 54b in the lower FIFO unit 50. The connection up until now is identical to the connection in the configuration in FIG. 1. In the configuration in FIG. 5, the input port N9 is connected to the FIFO 51c in the lower FIFO unit 50. The input port N10 is connected to the FIFO 52c in the lower FIFO unit 50. The input port N11 is connected to the FIFO 53c in the lower FIFO unit 50. The input port N12 is connected to the FIFO 54c in the lower FIFO unit 50.

The processor 10 includes one output port (N6 (output)) used to output, as process results, output data and three output ports (N0, N4 and N8) used to output the line data in the original input state thereof. The transfer port N0 outputs the line data that has been input to the input port N0, the transfer port N4 outputs the line data that has been input to the input port N4, and the transfer port N8 outputs the line data that has been input to the input port N8.

Through the setting method of the transfer port described with reference to FIG. 1, the output port corresponding to the input port N0 is set as the transfer port. Also set as the transfer ports are the output ports that correspond to the input ports (N4 and N8) from among input ports (N4, N8, and N12) at locations corresponding to an integer multiple of the number of channels C of the reading DMAC 32 but excluding the input port (N12) corresponding to the last line data.

The transfer port N0 is connected to the FIFO 55a in the lower FIFO unit 50. The transfer port N4 is connected to the FIFO 55b in the lower FIFO unit 50. The transfer port N8 is connected to the FIFO 55c in the lower FIFO unit 50. The line data output from the transfer ports N0, N4, and N8 are supplied to the FIFOs 55a, 55b, and 55c in the lower FIFO unit 50 on the side of the writing DMAC 31. Specifically, in the example in FIG. 5, the output on the transfer port N0 is supplied the FIFO 55a, the output on the transfer port N4 is supplied to the FIFO 55b, and the output on the transfer port N8 is supplied to the FIFO 55c.

The line data saved at the FIFOs 55a, 55b, and 55c in the lower FIFO unit 50 is successively supplied to the FIFO 45 in the upper FIFO unit 40. In the example in FIG. 5, the line data is saved in the order of $(L_{N0}, P_1), (L_{N4}, P_1), (L_{N8}, P_1), (L_{N0}, P_2), \ldots$ The writing DMAC 31 reads the line data in order from the FIFO 45 and saves the line data on the memory 20 via the bus bridge 60.

The reading DMAC 32 reads the line data for the number of channels of the reading DMAC 32 from the memory 20 via the bus bridge 60 and causes the FIFOs 41 through 44 in the upper FIFO unit 40 to save the read line data. The FIFO 41 saves the line data that is successively supplied to the FIFOs 51a, 51b, and 51c in the lower FIFO unit 50. In the example in FIG. 5, the line data $(L_{N1}, P_1), (L_{N5}, P_1), (L_{N9}, P_1), (L_{N1}, P_2), \ldots$, is saved on the FIFO 41.

The FIFO 42 saves the line data that is successively supplied to the FIFOs 52a, 52b, and 52c in the lower FIFO unit 50. In the example in FIG. 5, the line data $(L_{N2}, P_1), (L_{N6}, P_1), (L_{N10}, P_1), (L_{N2}, P_2), \ldots$, is saved on the FIFO 42. The line data supplied to the FIFO 42 is the line data that is supplied to the FIFO 41 in the immediately preceding cycle. The line data is thus supplied to the FIFO 42 from the memory 20 with one line shifted.

The FIFO 43 saves the line data that is successively supplied to the FIFOs 53a, 53b, and 53c in the lower FIFO unit 50. In the example in FIG. 5, the line data $(L_{N3}, P_1), (L_{N7}, P_1), (L_{N11}, P_1), (L_{N3}, P_2), \ldots$, is saved on the FIFO 43. The line data supplied to the FIFO 43 is the line data that is supplied to the FIFO 42 in the immediately preceding cycle. The line data is thus supplied to the FIFO 43 from the memory 20 with one line shifted.

The FIFO 44 saves the line data that is successively supplied to the FIFOs 54a, 54b, and 54c in the lower FIFO unit 50. In the example in FIG. 5, the line data $(L_{N4}, P_1)$, $(L_{N8}, P_1)$, $(L_{N12}, P_1)$, $(L_{N4}, P_2)$, . . . , is saved on the FIFO 44. The line data supplied to the FIFO 44 is the line data that is supplied to the FIFO 43 in the immediately preceding cycle. The line data is thus supplied to the FIFO 44 from the memory 20 with one line shifted.

The line data is successively supplied from the FIFO 41 to the FIFOs 51a, 51b, and 51c in the lower FIFO unit 50. In the example in FIG. 5, the line data $(L_{N1}, P_1)$, $(L_{N1}, P_2)$, $(L_{N1}, P_3)$, $(L_{N1}, P_4)$, . . . is transferred to the FIFO 51a, the line data $(L_{N5}, P_1)$, $(L_{N5}, P_2)$, $(L_{N5}, P_3)$, $(L_{N5}, P_4)$, . . . is transferred to the FIFO 51b, and the line data $(L_{N9} P_1)$, $(L_{N9}, P_2)$, $(L_{N9}, P_3)$, $(L_{N9}, P_4)$, . . . is transferred to the FIFO 51c. Similarly, the line data is successively transferred from the FIFO 42 to the FIFOs 52a, 52b, and 52c, the line data is successively transferred from the FIFO 43 to the FIFOs 53a, 53b, and 53c, and the line data is successively transferred from the FIFO 44 to the FIFOs 54a, 54b, and 54c. In the example in FIG. 5, the line data $(L_{N2}, P_1)$, $(L_{N2}, P_2)$, $(L_{N2}, P_3)$, $(L_{N2}, P_4)$, . . . is transferred to the FIFO 52a, the line data $(L_{N6}, P_1)$, $(L_{N6}, P_2)$, $(L_{N6}, P_3)$, $(L_{N6}, P_4)$, . . . is transferred to the FIFO 52b, and the line data $(L_{N10}, P_1)$, $(L_{N10}, P_2)$, $(L_{N10}, P_3)$, $(L_{N10}, P_4)$, . . . is transferred to the FIFO 52c. The line data $(L_{N3}, P_1)$, $(L_{N3}, P_2)$, $(L_{N3}, P_3)$, $(L_{N3}, P_4)$, . . . is transferred to the FIFO 53a, the line data $(L_{N7}, P_1)$, $(L_{N7}, P_2)$, $(L_{N7}, P_3)$, $(L_{N7}, P_4)$, . . . is transferred to the FIFO 53b, and the line data $(L_{N11} P_1)$, $(L_{N11} P_2)$, $(L_{N11} P_3)$, $(L_{N11} P_4)$, . . . is transferred to the FIFO 53c. The line data $(L_{N4}, P_1)$, $(L_{N4}, P_2)$, $(L_{N4}, P_3)$, $(L_{N4}, P_4)$, . . . is transferred to the FIFO 54a, the line data $(L_{N8}, P_1)$, $(L_{N8}, P_2)$, $(L_{N8}, P_3)$, $(L_{N8}, P_4)$, . . . is transferred to the FIFO 54b, and the line data $(L_{N12} P_1)$, $(L_{N12} P_2)$, $(L_{N12} P_3)$, $(L_{N12} P_4)$, . . . is transferred to the FIFO 54c.

The FIFOs 51a, 51b, and 51c through 54a, 54b, and 54c in the lower FIFO unit 50 supply the line data with the same synchronization information $(P_1, P_2, P_3, P_4, \ldots)$ to the processor 10. Each time the line data is supplied to the processor 10, the input port N0 in the processor 10 receives the newly read line data.

Figure 6:
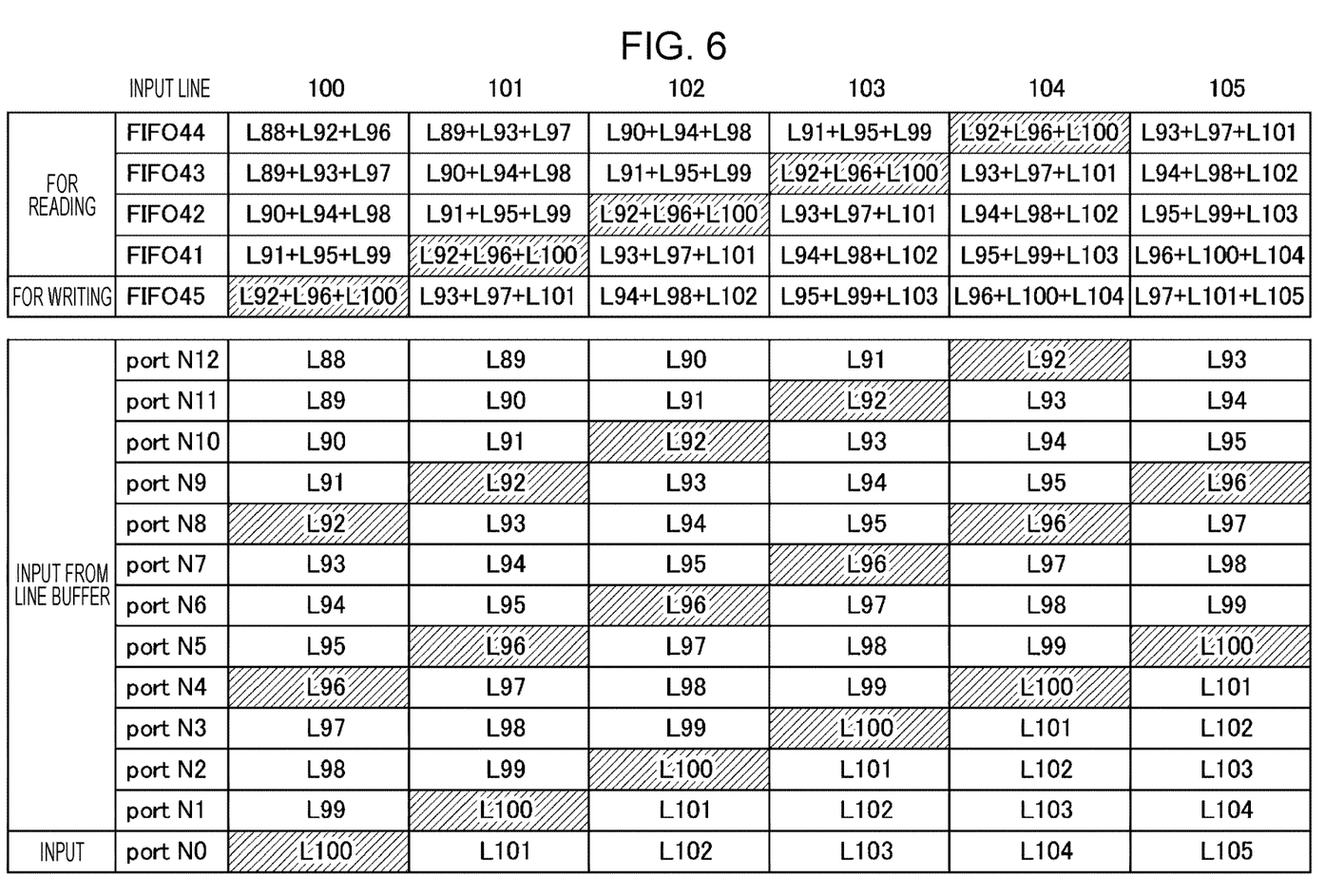
FIG. 6 illustrates a relationship between each FIFO in the upper FIFO unit and the input ports of the processor.

FIG. 6 illustrates the relationship between each of the FIFOs 41 through 45 in the upper FIFO unit 40 and each of the input ports of the processor 10. FIG. 6 illustrates in detail the line data input to the input ports N0 through N12 of the processor 10 and the line data saved at the FIFOs 41 through 45 in the upper FIFO unit 40 at the timing (cycle) when the line data on 100th through 105th lines is input through the image reading to the input lines (input port NO).

Referring to FIG. 6, when the line data on the 100th line is input to the input port N, the FIFOs 41 through 44 on the side of the reading DMAC 32 saves the next line data.

FIFO 41: $(L_{N1}, P_1)$, $(L_{N5}, P_1)$, $(L_{N9}, P_1)$→L99, L95, L91
FIFO 42: $(L_{N2}, P_1)$, $(L_{N6}, P_1)$, $(L_{N10}, P_1)$→L98, L94, L90
FIFO 43: $(L_{N3}, P_1)$, $(L_{N7}, P_1)$, $(L_{N11}, P_1)$→L97, L93, L89
FIFO 44: $(L_{N4}, P_1)$, $(L_{N8}, P_1)$, $(L_{N12}, P_1)$→L96, L92, L88

The line data is distributed into the FIFOs 51a, 51b, and 51c through 54a, 54b, and 54c in the lower FIFO unit 50 and then transferred to the input ports N1 through N12 as described below. Specifically, the line data is input to the input ports in the order of age, namely, the older data is input to the input port N12 and the younger data is input to the input port N1.

Input port N12: L88
Input port N11: L89
Input port N10: L90
Input port N9: L91
Input port N8: L92
Input port N7: L93
Input port N6: L94
Input port N5: L95
Input port N4: L96
Input port N3: L97
Input port N2: L98
Input port N1: L99

In this cycle, the line data "L100" on the 100th line is input to the input port NO. In the next cycle, the line data "L101" on the 101st line is input to the input port NO. The line data read by the reading DMAC 32 and saved at the FIFOs 41 through 44 and the line data distributed into the input ports N1 through 12 are shifted from the state described above to the new state line by line.

The line data output from the transfer ports NO, N4, and N8 is now considered. The line data input to the input ports NO, N4, and N8 is output in the original input state thereof from the transfer ports NO, N4, and N8. At the timing when the line data (L100) on the 100th line is input to the input port NO, the output of the transfer port N0 is L100, the output of the transfer port N4 is L96, and the output of the transfer port N8 is L92. The FIFO 45 on the side of the writing DMAC 31 holds $L_{N0}=L100$, $L_{N4}=L96$, and $L_{N8}=L92$. Referring to FIG. 6, the locations of L100, L96, and L92 are hatched. As illustrated in FIG. 6, in each cycle, the new line data is input from the input port N0 and, accordingly, the locations of the input ports receiving L100, L96, and L92 are shifted line by line. In concert with this shifting, the FIFOs 41 through 44 saving L100, L96, and L92 read from the memory 20 are also shifted.

Control of the window size of the image processing apparatus 1 constructed as illustrated in FIG. 5 is described below. In the configuration in FIG. 5, the window size in the processor 10 is increased by making the FIFOs 41 through 45 respectively correspond to the FIFOs 51a, 51b, and 51c through 55a, 55b, and 55c in the lower FIFO unit 50. The window size may be modified (reduced) by inactivating part of the FIFOs 51a, 51b, and 51c through 55a, 55b, and 55c in the lower FIFO unit 50 corresponding to the FIFOs 41 through 45 in the upper FIFO unit 40.

Figure 7:
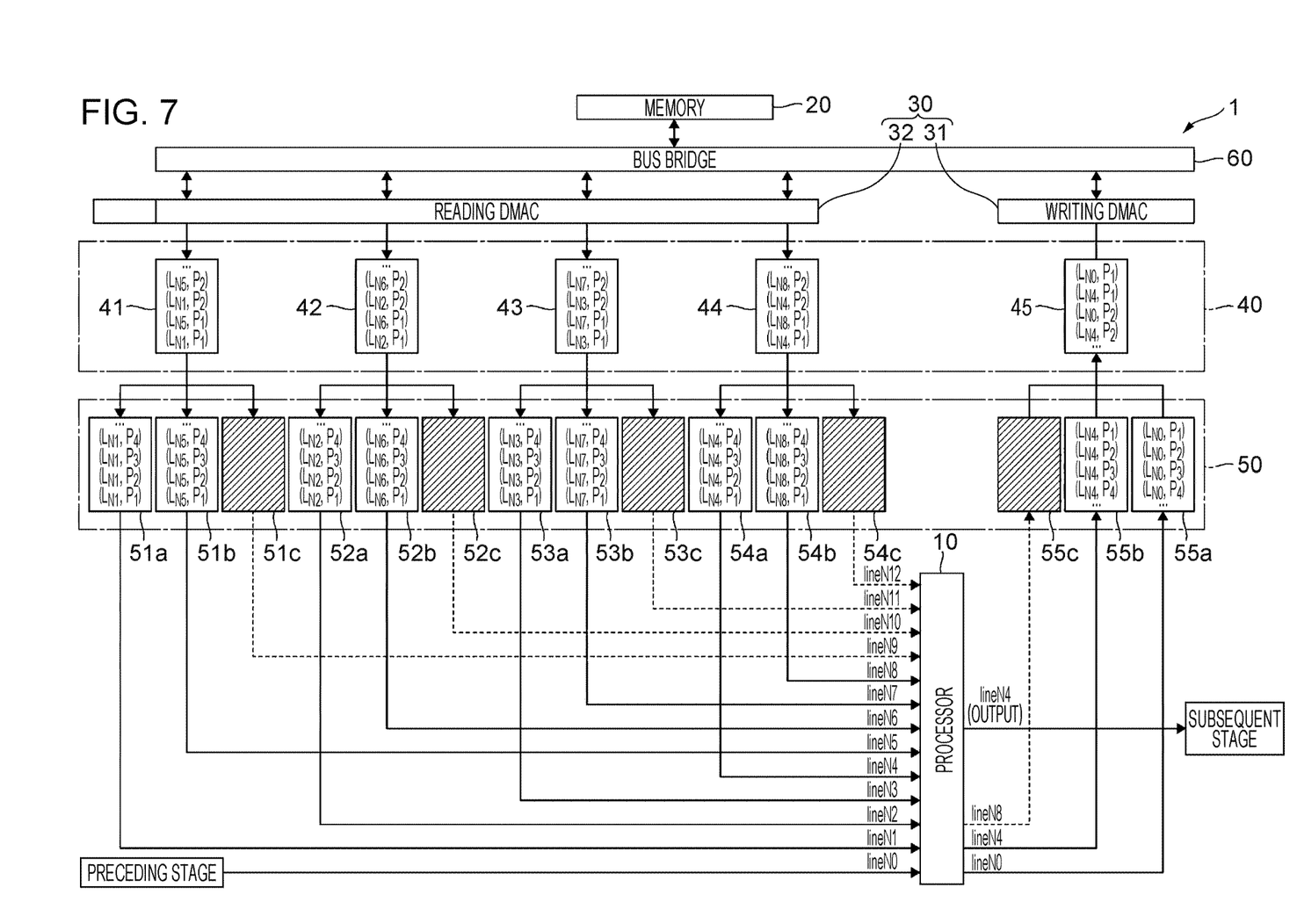
FIG. 7 illustrates a control example of the window size.

FIG. 7 illustrates a control example of the window size. Referring to FIG. 7, from among the FIFOs 51a, 51b, and 51c through 55a, 55b, and 55c in the lower FIFO unit 50, FIFOs 51c, 52c, 53c, 54c, and 55c are inactivated and only the FIFOs 51a, 51b, 52a, 52b, 53a, 53b, 54a, and 54b are used. The window size is thus modified (reduced) to 9 lines without modifying the configuration of the DMAC 30 and the upper FIFO unit 40.

From among the input ports of the processor 10, the input port N0 connected to the input line and the input ports N1 through N8 connected to the FIFOs 51a and 51b through 55a and 55b are used and the input ports N9 through N12 are not used. In such a case, the data selector 122 (see FIG. 2) may disconnect the input ports N9 through N12. Since the line data is not input from FIFOs 51c, 52c, 53c, 54c, and 55c, the input ports N9 through N12 may not necessarily be disconnected.

Since the active input ports in the processor 10 is NO through N8, the output port is changed to N4 serving as the center line. Concerning the transfer ports in the processor 10, the transfer port N0 through which the input to the input port N0 is output is used, the transfer port N4 through which the input to the input port N4 is output is used. On the other hand, the transfer port N8 through which the input to the input port N8 is output is not used. In such a case, the data selector 132 (see FIG. 2) disconnects the transfer port N8 such that the input to the input port N8 is not transferred to the FIFO 55c.

Figure 8:
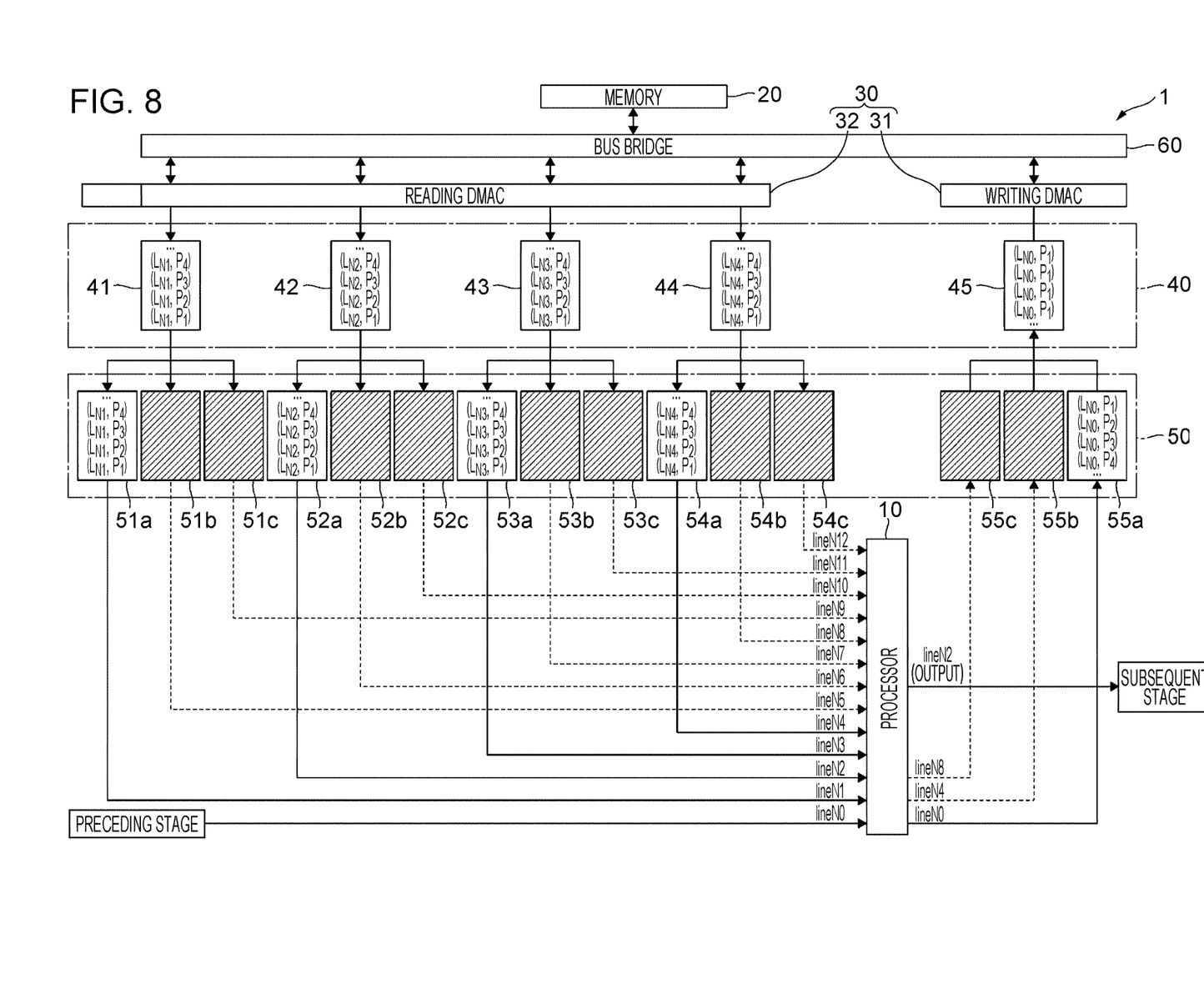
FIG. 8 illustrates another control example of the window size.

FIG. 8 illustrates another control example of the window size. Referring to FIG. 8, from among the FIFOs 51a, 51b, and 51c through 55a, 55b, and 55c in the lower FIFO unit 50, the FIFOs 51b, 51c, 52b, 52c, 53b, 53c, 54b, 54c, 55b, and 55c are inactivated and only FIFOs 51a, 52a, 53a, 54a, and 55a are used. The window size is thus modified (reduced) to 5 lines without modifying the configuration of the DMAC 30 and the upper FIFO unit 40.

From among the input ports of the processor 10, the input port N0 connected to the input line and the input ports N1 through N4 connected to the FIFOs 51a, 52a, 53a, 54a, and 55a are used and the input ports N5 through N12 are not used. In such a case, the data selector 122 (see FIG. 2) may disconnect the input ports N5 through N12. Since the line data is not input from FIFOs 51b, 51c, 52b, 52c, 53b, 53c, 54b, and 54c, the input ports N5 through N12 may not necessarily be disconnected.

Since the active input ports in the processor 10 is N0 through N4, the output port is changed to N2 serving as the center line. Concerning the transfer ports in the processor 10, the transfer port N0 through which the input to the input port N0 is output is used, and the transfer port N4 through which the input to the input port N4 is output and the transfer port N8 through which the input to the input port N8 is output are not used. In such a case, the data selectors 132 (see FIG. 2) disconnect the transfer ports N4 and N8 such that the inputs to the input ports N4 and N8 are not transferred to the FIFO 55b and 55c.

In the examples described above, the window size in the processor 10 is controlled by using all or part of FIFOs in the lower FIFO unit 50. The number of lines of the line data may be changed in steps of the number of channels of the reading DMAC 32. In contrast, the window size in the processor 10 may be controlled in steps, with the magnitude of the step smaller than the number of channels of the reading DMAC 32, by activating or inactivating the lines input to the processor 10.

This control is described with reference to the configuration in FIG. 1. In the configuration in FIG. 1, the line data on 9 lines are input to the processor 10. From among the 9 lines, the line N0 receives the line data read by the image reading device (preceding stage). The remaining 8 lines N1 through N8 receive the line data read from the line buffer.

If all the FIFOs 51a and 51b through 54a and 54b in the lower FIFO unit 50 are used, the processor 10 receives the line data on the 9 lines. The window size in the processor 10 is thus 9 lines. As illustrated in FIG. 4, if FIFOs 51b, 52b, 53b, and 54b in the lower FIFO unit 50 are not used, the line data input to the processor 10 is 5 lines. The window size in the processor 10 is thus 5 lines. The difference between these two cases is 4 lines and thus corresponds to the number of channels of the reading DMAC 32.

In contrast with the above cases, the input port for 2 lines may be inactivated in the processor 10. The switching between the activation and inactivation of the input ports is performed by the data selectors 122 (see FIG. 2) in the input unit 12 in the processor 10. The processor 10 receives and processes only the line data on the active 7 lines. The window size is thus 7 lines. In this way, the window size is more finely controlled than when the window size is controlled by using the FIFOs in the lower FIFO unit 50.

Which lines to be inactivated may be determined such that the remaining active lines become 7 consecutive lines. For example, the line data (line N0) read last from the image and the line data (line N8 in FIG. 1) that is the oldest out of the line data read from the memory 20 may be inactivated and the line data (lines N1 through N7 in FIG. 1) between the two lines may be activated. Alternatively, two older lines (line N8 and N7 in FIG. 1) may be inactivated and the other line data (line N0 through N6 in FIG. 1) may be activated. In the former case, the line data on both end input lines is inactivated. Referring to FIGS. 1, 5, and 10, if the line data on the center line from among the input lines is set to be the output data, the line data on the line remaining unchanged after the modification of the window size is set to be the output data. The output line is free from being changed.

The control method in the configuration in FIG. 1 has been described. The same control method is also applicable to the configuration in FIG. 5. The window size may be controlled in a variety of ways by combining the control method of the window size through switching the lines and the control method of the window size through not using part of the FIFOs in the lower FIFO unit 50 as described with reference to FIGS. 4, 7, and 8.

Figure 9:
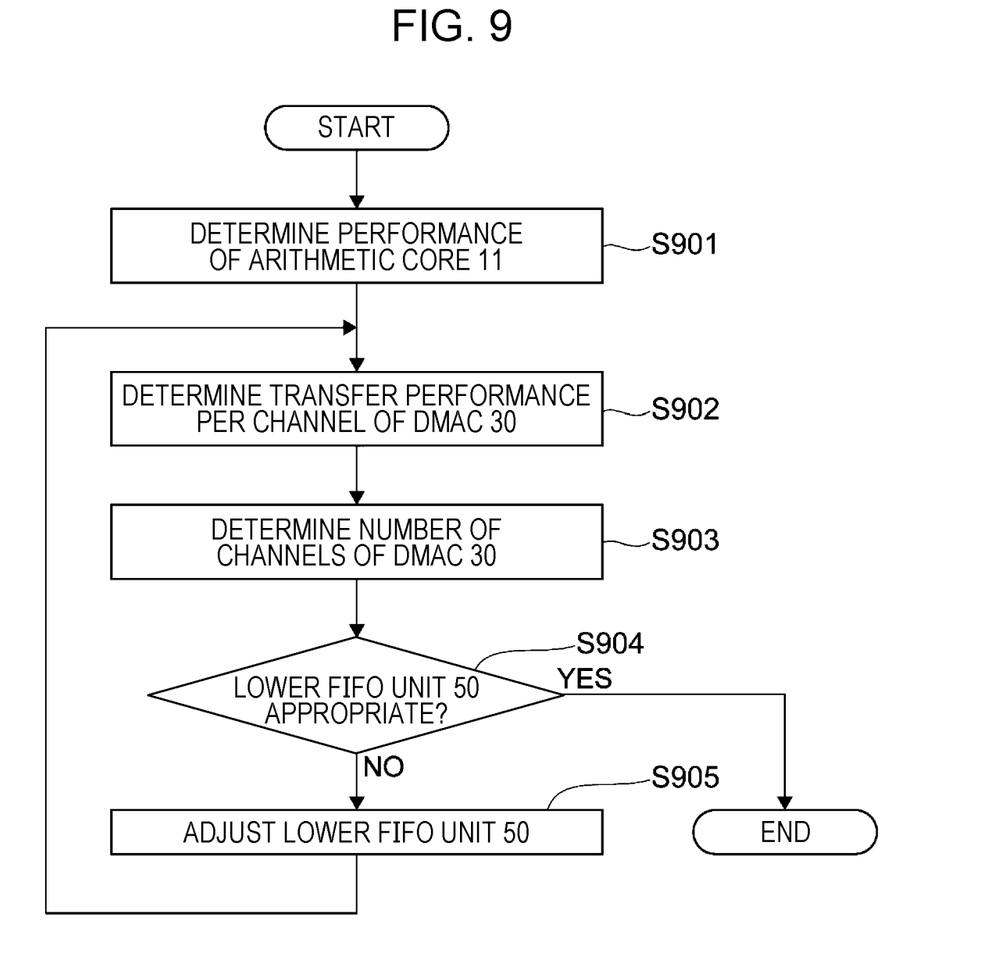
FIG. 9 is a flowchart illustrating a design procedure of the image processing apparatus.

FIG. 9 is a flowchart illustrating a design procedure of the image processing apparatus 1. Design performance for the arithmetic core 11 in the processor 10 is determined (step S901). If image processing performance (image quality) has a higher priority in the design performance, a processing amount increases, leading to a decrease in processing speed. On the contrary, if the processing speed has a higher priority, the image quality decreases. In view of request from a system to which the image processing apparatus 1 is applied, the image quality is desirably balanced with the processing speed.

Transfer performance per channel of the DMAC 30 is determined in accordance with bus width, latency, and the like (step S902). The transfer performance is an index that represents how much line data is transferable to the memory 20 via a processing cycle of one channel of the DMAC 30. The bus width is one of parameters directly related to the transfer performance and represents how many bits of data is readable (or writable) in a single reading operation or writing operation. The latency is one of the parameters directly related to the transfer performance and represents the number of clocks used from when a data read or write command is issued to when the data reading or writing operation is actually terminated.

The number of channels of the DMAC 30 is determined to satisfy the design performance of the arithmetic core 11 in the processor 10 determined in step S901 (step S903). Specifically, the number of channels of the reading DMAC 32 to supply the line data to the processor 10 is determined. A determination is made as to whether the number of FIFOs in the lower FIFO unit 50 to identify the number of lines for the line data to supply the line data to the processor 10 is appropriate (in other words, excessive or insufficient) for the determined number of channels of the DMAC 30 (in particular, the reading DMAC 32).

If the number of FIFOs in the lower FIFO unit 50 is not appropriate (no path from step S904), the number of FIFOs in the lower FIFO unit 50 is adjusted (step S905). The process returns to step S902. The setting of the DMAC 30 and the lower FIFO unit 50 responsive to the design performance is repeated. If the number of FIFOs in the lower FIFO unit 50 is determined to be appropriate (yes path from step S904), the design of the image processing apparatus 1 is complete.

In the exemplary embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to process an image;
a reading direct memory access controller (DMAC) and a writing direct memory access controller (DMAC), each DMAC configured to control direct memory access to a memory, the reading DMAC configured to read data from the memory, the writing DMAC being configured to write data to the memory;
an upper first-in first-out (FIFO) unit that is connected to the reading DMAC and the writing DMAC and includes FIFOs whose number is equal to a number of channels of each of the reading DMAC and the writing DMAC; and
a lower FIFO unit that is connected between the upper FIFO unit and the processor and includes FIFOs that correspond to the FIFOs in the upper FIFO unit at a ratio of 1 FIFO in the upper FIFO unit to F FIFOs in the lower FIFO unit (F being an integer equal to 2 or larger), wherein a number of lines of data input to the processor is modifiable in steps of the number of channels of the reading DMAC by not using part of the F FIFOs corresponding to each FIFO of the upper FIFO unit.

2. The image processing apparatus according to claim 1, wherein the number of lines of data input to the processor is modifiable in steps of two lines by excluding predetermined two lines of data out of a plurality of lines of data input to the processor.

3. The image processing apparatus according to claim 2, wherein when the two lines of data input to the processor are excluded, data read last from the image or data read from the memory and acquired from the lower FIFO unit, whichever is older, is excluded.

4. The image processing apparatus according to claim 1, wherein the processor is configured to receive and process n lines of data including a line of data read from the image and (n−1) lines of data read from the memory and acquired from the lower FIFO unit and to output a line of processed data,
wherein a number of the FIFOs in the upper FIFO unit connected to the reading DMAC is C (C is an integer equal to 1 or larger) corresponding to the number of channels of the reading DMAC, and
wherein a number of the FIFOs in the lower FIFO unit corresponding to the upper FIFO unit connected to the reading DMAC is C×F which equals (n−1).

5. The image processing apparatus according to claim 4, wherein the reading DMAC has 1 channel, and
wherein the processor is configured to receive as a process target the n lines of data including line data N0 as one line of data read last from the image and line data N1 through N(n−1) as (n−1) lines of data acquired from the lower FIFO unit and read (n−1) lines ago through one line ago and to transfer line data NL (L=C×(P−1)) on F lines out of the received line data (P being an integer defined as 1≤P≤F) to the lower FIFO unit corresponding to the upper FIFO unit connected to the writing DMAC.

6. The image processing apparatus according to claim 5, wherein in the upper FIFO unit and the lower FIFO unit on a side of the writing DMAC, data transferred from the processor to the lower FIFO unit is transferred sequentially from each of F FIFOs in the lower FIFO unit to the upper FIFO unit in steps of a data piece and the writing DMAC writes the data from the upper FIFO unit to the memory, and
wherein in the upper FIFO unit and the lower FIFO unit on a side of the reading DMAC, data read from the memory by the reading DMAC and saved on the C FIFOs in the upper FIFO unit is sequentially saved, in steps of the data piece in accordance with an order of lines input to the processor, on the F FIFOs in the lower FIFO unit corresponding to each FIFO in the upper FIFO unit.

7. An image processing apparatus comprising:
processor means configured to process an image;
reading direct memory access controller (DMAC) means and writing direct memory access controller (DMAC) means, each DMAC means configured to control direct memory access to a memory, the reading DMAC means configured to read data from the memory, the writing DMAC means configured to write data to the memory;
upper first-in first-out (FIFO) means that is connected to the reading DMAC and the writing DMAC and includes FIFOs of a number equal to a number of channels of each of the reading DMAC and the writing DMAC; and
lower FIFO means that is connected between the upper FIFO means and the processor and includes FIFOs that correspond to the FIFOs in the upper FIFO means at a ratio of 1 FIFO in the upper FIFO means to F FIFOs in the lower FIFO means (F being an integer equal to 2 or larger), wherein a number of lines of data input to the processor is modifiable in steps of the number of channels of the reading DMAC means by not using part of the F FIFOs corresponding to each FIFO of the upper FIFO means.

* * * * *